US010838096B2

(12) United States Patent
Sudow

(10) Patent No.: US 10,838,096 B2
(45) Date of Patent: Nov. 17, 2020

(54) METHOD AND APPARATUS FOR DYNAMIC ROLL COMPENSATION OF STREAMER FOR MARINE GEOPHYSICAL SURVEYING

(71) Applicant: PGS Geophysical AS, Oslo (NO)

(72) Inventor: Gustav Goran Mattias Sudow, Solna (SE)

(73) Assignee: PGS Geophysical AS, Oslo (NO)

( * ) Notice: Subject to any disclaimer, the term of this patent is extended or adjusted under 35 U.S.C. 154(b) by 356 days.

(21) Appl. No.: 15/829,254

(22) Filed: Dec. 1, 2017

(65) Prior Publication Data

US 2018/0164458 A1 Jun. 14, 2018

Related U.S. Application Data

(60) Provisional application No. 62/433,305, filed on Dec. 13, 2016.

(51) Int. Cl.
*G01V 1/38* (2006.01)
*G01V 1/36* (2006.01)
(Continued)

(52) U.S. Cl.
CPC ......... *G01V 1/3808* (2013.01); *G01C 21/165* (2013.01); *G01V 1/201* (2013.01);
(Continued)

(58) Field of Classification Search
CPC ...... G01C 21/165; G01V 1/201; G01V 1/364; G01V 1/38; G01V 1/162; G01V 1/181;
(Continued)

(56) References Cited

U.S. PATENT DOCUMENTS 6,932,017 B1 8/2005 Hillesund et al.
7,080,607 B2 7/2006 Hillesund et al.
(Continued)

FOREIGN PATENT DOCUMENTS

WO 2009/117360 A2 9/2009
WO 2013052423 A2 4/2013

OTHER PUBLICATIONS

K.G. Birch, et al. "A Moored Surface-Following Buoy for Spectral Wind Measurements with Satellite and VHF Data Telemetry", Jul. 1994, pp. 90-97, Electronic Engineering in Oceanography, IEE Conference Publication No. 394.
(Continued)

*Primary Examiner* — Krystine E Breier
(74) *Attorney, Agent, or Firm* — Okamoto & Benedicto LLP

(57) ABSTRACT

Included are methods and apparatus for marine geophysical surveying. One embodiment of the presently-disclosed solution relates to a method for instantaneous roll compensation of vectorised motion data originating from a fixed-mount geophysical sensor during a marine seismic survey. A streamer is towed behind a survey vessel in a body of water. The streamer includes a plurality of geophysical sensors and a plurality of orientation sensor packages, and each orientation sensor package comprises a magnetometer. Vectorised geophysical data is acquired using the plurality of geophysical sensors, while orientation data is acquired by the plurality of orientation sensor packages. The orientation data is used to determine an instantaneous roll angle of the streamer at different positions on the streamer. The vectorised geophysical data is adjusted to compensate for the instantaneous roll angle of the streamer at different positions on the streamer. Other embodiments and features are also disclosed.

24 Claims, 11 Drawing Sheets

(51) Int. Cl.
*G01V 13/00* (2006.01)
*G01V 3/165* (2006.01)
*G01V 11/00* (2006.01)
*G01C 21/16* (2006.01)
*G01V 1/20* (2006.01)
*G01V 1/18* (2006.01)
*G01V 1/16* (2006.01)

(52) U.S. Cl.
CPC ............ *G01V 1/364* (2013.01); *G01V 1/38* (2013.01); *G01V 3/165* (2013.01); *G01V 11/00* (2013.01); *G01V 13/00* (2013.01); *G01V 1/162* (2013.01); *G01V 1/181* (2013.01); *G01V 1/189* (2013.01); *G01V 1/36* (2013.01); *G01V 2210/144* (2013.01)

(58) Field of Classification Search
CPC .......... G01V 1/189; G01V 1/36; G01V 3/165; G01V 11/00; G01V 13/00
See application file for complete search history.

(56) References Cited

U.S. PATENT DOCUMENTS

| | | | |
|---|---|---|---|
| 7,142,481 B1 | 11/2006 | Melzbower | |
| 7,162,967 B2 | 1/2007 | Hillesund et al. | |
| 7,222,579 B2 | 5/2007 | Hillesund et al. | |
| 7,234,540 B2 | 6/2007 | Estes et al. | |
| 7,400,142 B2 | 7/2008 | Greelish | |
| 7,656,746 B2* | 2/2010 | De Kok | G01V 1/16 367/19 |
| 8,319,497 B2 | 11/2012 | Sudow | |
| 8,335,126 B2 | 12/2012 | Sudow | |
| 8,768,647 B1* | 7/2014 | Zaki | G01C 21/16 702/150 |
| 8,797,036 B2 | 8/2014 | Kennedy | |
| 8,896,313 B2 | 11/2014 | Lindqvist | |
| 8,994,378 B2 | 3/2015 | Juhasz et al. | |
| 9,052,412 B2* | 6/2015 | Ozdemir | G01V 1/3817 |
| 9,229,128 B2* | 1/2016 | Ozdemir | G01V 1/36 |
| 9,910,063 B2* | 3/2018 | Sudow | G01C 21/165 |
| 2006/0055584 A1 | 3/2006 | Waite et al. | |
| 2009/0217539 A1 | 9/2009 | Blake | |
| 2010/0096186 A1 | 4/2010 | Ekseth et al. | |
| 2011/0279120 A1* | 11/2011 | Sudow | G01V 1/3835 324/334 |
| 2012/0033526 A1 | 2/2012 | Hegna et al. | |
| 2013/0114374 A1 | 5/2013 | Juhasz et al. | |
| 2013/0127471 A1 | 5/2013 | Sudow et al. | |
| 2013/0286772 A1 | 10/2013 | Sudow | |
| 2013/0300420 A1 | 11/2013 | Juhasz et al. | |
| 2014/0153362 A1 | 6/2014 | Tenghamm | |
| 2015/0016216 A1 | 1/2015 | Sudow | |
| 2015/0016217 A1 | 1/2015 | Hillesund et al. | |
| 2015/0234071 A1 | 8/2015 | Hegna | |
| 2016/0282494 A1 | 9/2016 | Leboeuf | |
| 2016/0313366 A1 | 10/2016 | Sudow et al. | |
| 2016/0356906 A1* | 12/2016 | Ozdemir | G01V 1/36 |
| 2019/0064379 A1* | 2/2019 | Leboeuf | G01V 1/36 |

OTHER PUBLICATIONS

International Search Report and Written Opinion of the International Searching Authority for PCT Application No. PCT/EP2017/082428, dated Mar. 27, 2018 (Mar. 27, 2018), 13 sheets.

\* cited by examiner

METHOD AND APPARATUS FOR DYNAMIC ROLL COMPENSATION OF STREAMER FOR MARINE GEOPHYSICAL SURVEYING

CROSS-REFERENCE TO RELATED APPLICATIONS

The present application claims priority to U.S. Provisional Application No. 62/433,305, filed Dec. 13, 2016, the entire disclosure of which is incorporated herein by reference.

BACKGROUND

Embodiments relate generally to the field of marine geophysical surveying. Techniques for marine geophysical surveying include seismic surveying and electromagnetic surveying, in which geophysical data may be collected from below the Earth's surface. Marine geophysical surveying has applications in mineral and energy exploration and production and may be used to help identify locations of hydrocarbon-bearing formations.

Certain types of marine geophysical surveying, including seismic and electromagnetic surveying, may include using a survey vessel to tow an energy source at selected depths—typically above the seafloor—in a body of water. One or more streamers may also be towed in the water at the selected depths by the same or a different survey vessel. The streamers are typically cables that include a plurality of geophysical sensors disposed thereon at spaced apart locations along the length of the cable. Some geophysical surveys locate the geophysical sensors on ocean bottom cables or nodes in addition to, or instead of, streamers. The geophysical sensors may be configured to generate a signal that is related to a parameter being measured by the geophysical sensor.

At selected times during a marine geophysical survey, an energy source may be actuated to generate, for example, seismic or electromagnetic energy that travels downwardly into the subsurface formation. Energy that interacts with interfaces, generally at the boundaries between layers of subsurface formations, may be returned toward the surface and detected by the geophysical sensors on the streamers. The detected energy may be used to infer certain properties of the subsurface formation, such as structure, mineral composition and fluid content, thereby providing information useful in the recovery of hydrocarbons.

BRIEF DESCRIPTION OF THE DRAWINGS

These drawings illustrate certain aspects of some of the embodiments of the present invention and should not be used to limit or define the invention.

DETAILED DESCRIPTION

Figure 1:
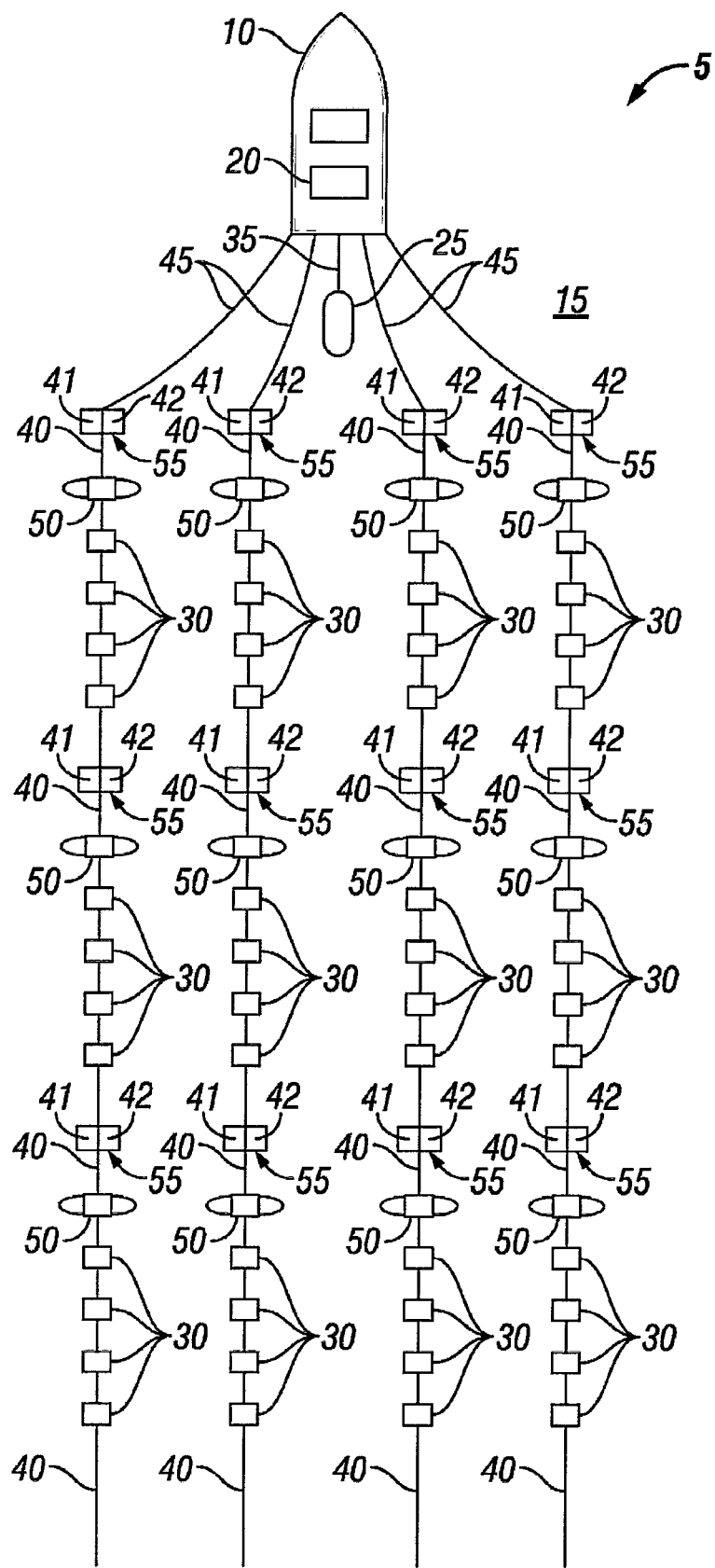
FIG. 1 illustrates an example marine geophysical survey system with a streamer having a sensor package in accordance with example embodiments.

The use of fix-mounted geophysical sensors in a streamer environment has some advantages over the use of gimbal-mounted geophysical sensors. In particular, fix-mounted sensors have simpler mounting technology that is more reliable and less costly than gimbaled sensors.

The removal of the gimbal poses a challenge, however, in that the orientation of the geophysical sensor needs to be determined to a high-degree of accuracy. This is especially true for the horizontal component due to the direction of the incoming wavefield. Furthermore, in order to avoid any instantaneous roll effects in the geophysical data, the compensation of roll angle should be done dynamically, rather than in a static manner.

One technique that addresses these problems uses a DC-coupled accelerometer as an orientation sensor. This technique is problematic, however, in that the data from a DC-coupled accelerometer may be heavily contaminated by translational acceleration noise, particularly at the streamer head and tail, and during turns of the survey vessel.

The present disclosure provides a solution for instantaneous roll compensation of vectorised motion data originating from a fixed-mount geophysical sensor. The solution is advantageously less sensitive to contamination by translational acceleration noise.

One embodiment of the presently-disclosed solution relates to a method for instantaneous roll compensation of vectorised motion data originating from a fixed-mount geophysical sensor during a marine seismic survey. A streamer is towed behind a survey vessel in a body of water. The streamer includes a plurality of geophysical sensors and a plurality of orientation sensor packages, and each orientation sensor package comprises a magnetometer. Vectorised geophysical data is acquired using the plurality of geophysical sensors, while orientation data is acquired by the plurality of orientation sensor packages. The orientation data is used to determine an instantaneous roll angle of the streamer at different positions on the streamer. The vectorised geophysical data is adjusted to compensate for the instantaneous roll angle of the streamer at different positions on the streamer.

Another embodiment of the presently-disclosed solution relates to an apparatus for performing a marine seismic survey. The apparatus includes a streamer to be towed behind a survey vessel in a body of water during the marine seismic survey. A plurality of geophysical sensors on the streamer acquires geophysical data during the marine seismic survey. In addition, a plurality of orientation sensor packages on the streamer acquires orientation data during the marine seismic survey, where each orientation sensor package comprises a magnetometer. A recording system receives and processes the geophysical and orientation data. The recording system uses the orientation data to determine an instantaneous roll angle of the streamer at different positions on the streamer, and the recording system adjusts the geophysical data to compensate for the instantaneous roll angle of the streamer at different positions on the streamer.

FIG. 1 illustrates a marine geophysical survey system 5 in accordance with an embodiment of the present invention. In the illustrated embodiment, the marine geophysical survey system 5 may include a survey vessel 10 that moves along the surface of a body of water 15, such as a lake or ocean. The survey vessel 10 may include thereon equipment, shown generally at 20 and referred to for convenience as a "recording system." The recording system 20 typically includes devices for navigating the survey vessel 10, such as global positioning system ("GPS") receivers, devices for actuating one or more energy sources 25, and devices for-recording signals generated by geophysical sensors 30.

As illustrated, the survey vessel 10 or a different vessel (not shown) can tow energy sources 25, for example, using source cable 35. The energy sources 25 may be towed above the water bottom. The energy sources 25 may be a selectively actuable energy source suitable for marine geophysical surveying, including seismic air guns, water guns, vibrators, electromagnetic field transmitters, or arrays of such devices. In some embodiments, seismic energy and/or electromagnetic energy may originate from the energy sources 25. As the energy is emitted by the energy sources 25, it travels downwardly through the body of water 15 and subsurface formations (not shown) below the water bottom. It should be noted that, while the present example shows only a single energy source 25, the invention is applicable to any number of energy sources 25 towed by survey vessel 10 or any other vessel.

The marine geophysical survey system 5 may include a plurality of streamers 40 towed by the survey vessel 10 (or another vessel) with each of the streamers 40 including the geophysical sensors 30 at spaced apart locations. The streamers 40 may be towed above the water bottom. The streamers 40 may be spaced apart laterally, vertically, or both laterally and vertically. "Lateral" or "laterally," in the present context, means transverse to the direction of the motion of the survey vessel 10. The streamers 40 may be coupled at their forward end (with respect to the direction of movement of the survey vessel 10) to corresponding lead-in lines 45. While not shown, each of the lead-in lines 45 may be deployed from the survey vessel 10 by a winch or other similar spooling device, for example, that can be used to control the deployed length of the lead-in lines 45. It should be noted that, while the present example shows only four streamers 40, the invention is applicable to any number of streamers 40 towed by survey vessel 10 or any other vessel. For example, in some embodiments, eight or more streamers 40 may be towed by survey vessel 10, while in other embodiments, as many as twenty-six or more streamers 40 may be towed by survey vessel 10.

The geophysical sensors 30 may be of various types or combinations thereof. Examples of geophysical sensors include seismic sensors such as geophones, hydrophones, or accelerometers; or electromagnetic field sensors such as electrodes or magnetometers. In an exemplary implementation, each of the geophysical sensors 30 may be a dual-sensor device. The dual-sensor device may include, for example, a pressure sensor and a vertical velocity sensor. By way of example, the geophysical sensors 30 may generate response signals, such as electrical or optical signals, in response to detecting energy emitted from the energy sources 25 after the energy has interacted with the rock formations (not shown) below the water bottom. Signals generated by the geophysical sensors 30 may be communicated to the recording system 20. In accordance with an embodiment of the invention, the signals generated by the geophysical sensors 30 and communicated to the recording system 20 comprise vectorised seismic data in that the signals include both magnitude and directional information.

In an exemplary implementation, a geophysical data product indicative of certain properties of the subsurface rock may be produced from the detected energy. The geophysical data product may include processed seismic or electromagnetic geophysical data and may be stored on a non-transitory, tangible computer-readable medium.

The streamers 40 may further include streamer rotation devices 50. As illustrated, the streamer rotation devices 50 may be disposed on the streamers 40 at spaced apart locations. In some embodiments, the streamer rotation devices 50 may have a spacing of about 200 meters to about 400 meters. Each streamer rotation device 50 may provide rotational torque to cause its rotation, and likewise rotation of the portion of the streamer 40 adjacent to the streamer rotation device 50. The streamer rotation devices 50 may also be used, for example, in the regulation of the streamer depth and streamer lateral positioning. In addition to regulation of depth and streamer lateral position, the streamer rotation devices 50 may also contain devices that output roll count and/or force data. In some embodiments, existing lateral force and depth (LFD) control devices may be used as streamer rotational devices. The LFD control devices may be any of a variety of different devices suitable for changing streamer orientation and/or position, including "birds" having variable-incidence wings. In one example, streamer rotation devices 50 may include variable incidence wings that are rotatably fixed onto the streamer. Examples of suitable streamer rotation devices 50 are disclosed in U.S. Pat. Nos. 6,525,992 and 6,932,017.

Figure 2:
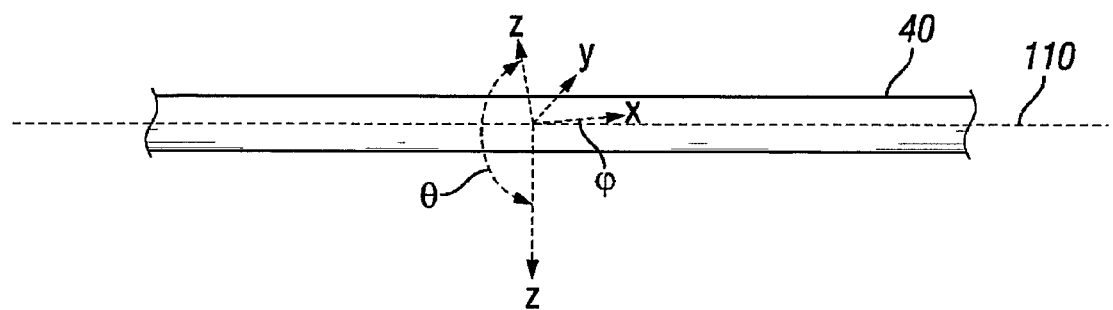
FIG. 2 illustrates the coordinate system for a particular sensor package in accordance with example embodiments.

The streamers 40 may further comprise sensor package 55. The sensor package 55 has an output that is representative of, or can be processed to determine, the orientation of the corresponding streamer 40 at the sensor package 55 with respect to the streamer's longitudinal axis. For example, the sensor package 55 may be used to measure rotation of the corresponding streamer 40 about its longitudinal axis. In some embodiments, the sensor package 55 may comprise at least one primary orientation sensor 41 which may measure angles of slope and/or inclination of the corresponding streamer 40 (or any geophysical surveying equipment to which it may be coupled to) with respect to Earth's gravity. The primary orientation sensor 41 may measure the roll angle of the corresponding streamer 40 about its longitudinal axis. The roll angle $\theta$ is shown on FIG. 2. The local coordinate system (x, y, z) for a particular sensor package 55 is shown on FIG. 2. In the illustration of FIG. 2, the roll angle θ is the angle of rotation about longitudinal axis 110 of the streamer 40 between the global Z-axis (Z) and the local z-axis (z). Examples of suitable primary orientation sensors 41 include accelerometers which may be DC-coupled to the Earth's gravity, which are commonly referred to as DC-coupled accelerometers. DC-coupled accelerometers may be considered to be coupled to the Earth's gravity because DC-coupled accelerometer measurements include the gravity component of acceleration. The accelerometer may be used, for example, to measure acceleration. A micro-electrical mechanical systems (MEMS) accelerometer is an example accelerometer sufficient for use as a primary orientation sensor 41. The primary orientation sensor 41 may measure the projection of the gravity vector along the sensing axis. In some embodiments, a 2-axis primary orientation sensor 41 may provide a measurement of linear acceleration along the x- and y-axes. In some embodiments, a 3-axis primary orientation sensor 41 may provide a measurement of linear acceleration along the x-, y-, and z-axes. Because the force of gravity is known and always acts towards Earth's center, the accelerometer outputs may be processed to compute the roll angle.

Sensor package 55 may further comprise a complementary orientation sensor 42 (FIG. 4) which may be DC-coupled, for example, to measure the Earth's magnetic field. Complementary orientation sensor 42 may measure angles of slope and/or inclination of the corresponding streamer 40 (or any geophysical surveying equipment to which it may be coupled to) with respect to Earth's magnetic field. In some embodiments, the complementary orientation sensor 42 may measure the roll angle of the corresponding streamer 40 about its longitudinal axis. The roll angle θ is shown on FIG. 2. The local coordinate system (x, y, z) for a particular sensor package 55 is shown on FIG. 2. In the illustration on FIG. 2, the roll angle θ is the angle of rotation about longitudinal axis 110 of the streamer 40 between the global Z-axis (Z) and the local z-axis (z). Examples of suitable complementary orientation sensors 42 may include vector magnetometers which may be DC-coupled to the Earth's magnetic field. Specific examples may include fluxgate and magnetoresistive magnetometers. The magnetoresistive magnetometer may comprise a permalloy magnetometer or may be a tunneling magnetoresistive magnetometer. The complementary orientation sensor 42 may measure the inclination, azimuth, and total intensity of the Earth's magnetic field. In some embodiments, the complementary orientation sensor 42 may be used to measure the magnetic field and magnetic inclination and azimuth at a point, and this information may be compared to the heading of the survey vessel 10/sensor package 55. From this information, the roll angle θ may be measured relative to gravity.

As discussed above, some embodiments of primary orientation sensor 41 (e.g., a DC-coupled accelerometer) may produce inaccurate orientation data (e.g., excess noise) when overlaid linear acceleration is present (e.g., when turning). Further, some embodiments of primary orientation sensor 41 may be sensitive to vibration (e.g., vibration which may occur at the front of the streamer 40). Complementary orientation sensor 42 may be used to provide accurate orientation data during turns and/or in situations in which vibration (e.g., vibration large enough to interfere with primary orientation sensor 41) is present. Complementary orientation sensor 42 (e.g., a DC-coupled magnetometer) may produce inaccurate orientation data (e.g., excess noise) when electrical interference is present. Further, embodiments of complementary orientation sensor 42 may not be used when the magnetic inclination is near 0°. Primary orientation sensor 41 may be used to provide accurate orientation data when electrical interference is present and/or in situations where the magnetic inclination is near 0°. Therefore, primary orientation sensor 41 and complementary orientation sensor 42 may be used in conjunction to produce orientation data that is more accurate in more circumstances than using either orientation sensor alone.

Measurements by the complementary orientation sensor may be used in place of, or in supplement to, measurements by the primary orientation sensor to provide accurate orientation data during turns. Measurements by the complementary orientation sensor is used in place of, or in supplement to, measurements by the primary orientation sensor to provide accurate orientation data when vibrations larger than a threshold are detected in the measurements by the primary orientation sensor.

Measurements by the primary orientation sensor is used in place of, or in supplement to, measurements by the complementary orientation sensor to provide accurate orientation data when electrical interference is present and when magnetic inclination of the magnetometer is near zero. Measurements by the primary orientation sensor is used in place of, or in supplement to, measurements by the complementary orientation sensor to provide accurate orientation data when electrical interference above a threshold is present in the measurements by the complementary orientation sensor.

The sensor package 55 may be rigidly mounted to the corresponding streamer 40 so that its output represents streamer roll at its current locations. In some embodiments, the sensor package 55 may not be co-located with the streamer rotation devices 50. In some embodiments, the sensor package 55 may not be co-located with any geophysical sensors 30. Alternatively, the sensor package 55 may be co-located with the streamer rotation devices 50 and/or the sensor package 55 may be co-located with any geophysical sensors 30. As used herein, sensors are considered co-located when the sensors are fixed to the same mechanical mount or otherwise cannot move relative to one another. In further alternative embodiments, the sensor package 55 may be disposed on or about the streamer rotation devices 50 and/or the geophysical sensors 30 in place of, or in addition to, mounting of the sensor packages 55 on the streamers 40. In some embodiments, complementary orientation sensor 42 may not be a component of every sensor package 55. For example, complementary orientation sensor 42 may not be a component of a sensor package when vibration is not present at a magnitude to affect primary orientation sensor 41 (e.g., 500 m to 1 km from survey vessel 10) or when other complementary orientation sensors 42 provide enough accurate orientation data during turns to eliminate the need for placement of a complementary orientation sensor in every sensor package 55. Scattered usage of complementary orientation sensors 42 as necessary may reduce expenses and preparation time as there would be fewer complementary orientation sensors 42 to purchase, install, and calibrate. From a measurement perspective, it may be desirable to have a less dense distribution of sensor packages 55 than geophysical sensors 30, as the operational requirements are likely to be non-overlapping.

The sensor packages 55 may be spaced along the length of the streamers 40 as desired. In some embodiments, the sensor packages 55 may have a spacing of from about 2 meters to about 50 meters on the streamers 40 or a particular section thereof. In particular embodiments, the sensor packages 55 may have spacing of about 5 meters to about 10 meters on the streamers 40 or a particular section thereof. In some embodiments, the sensor packages 55 may have a uniform distribution along the streamers 40 or a particular section thereof. For example, the sensor packages 55 may be uniformly distributed over a streamer section having a length of from about 75 meters to about 150 meters in some embodiments. In some embodiments, at least 10 sensor packages 55 and up to 20 or more sensor packages 55 may be distributed over the streamer 40 section. Sensor packages 55 may be distributed on streamer 40 at a spacing in a range of between, and including any of, about 2 to about 14 meters. For example, sensor packages 55 may be distributed in streamer 40 at a spacing of about 2 meters, about 4 meters, about 6 meters, about 8 meters, about 10 meters, about 12 meters, or about 14 meters. In a specific example, sensor packages 55 are distributed on streamer 40 every 6.25 meters.

Figure 3:
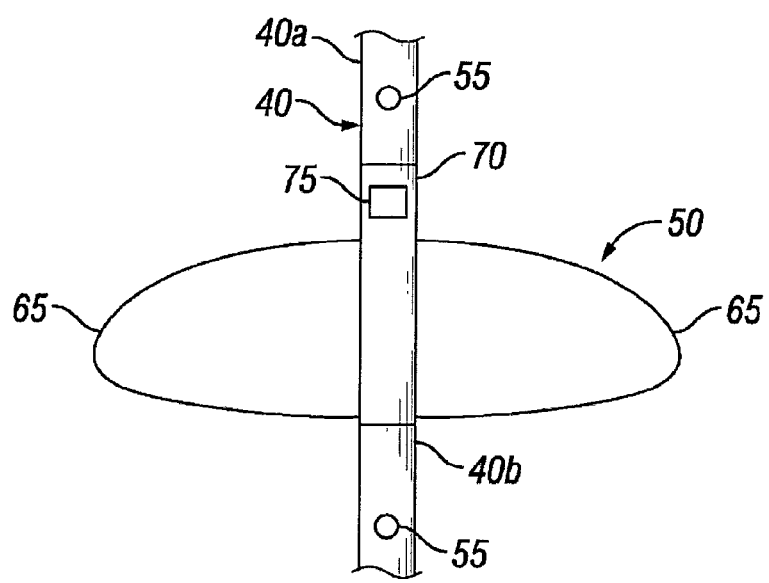
FIG. 3 illustrates an example portion of a streamer having a sensor package and a streamer rotation device in accordance with example embodiments.

FIG. 3 shows an example portion of a streamer 40 having a streamer rotation device 50 and sensor package 55. As illustrated, the sensor package 55 may also be distributed along the portion of the streamer 40. While not illustrated, one or more geophysical sensors 30 (e.g., shown on FIG. 1) may also be distributed along the portion of the streamer 40. The streamer rotation device 50 may be disposed on the streamer 40. As illustrated, the streamer rotation device 50 may have wings 65 coupled to a device body 70. While two wings 65 are shown on FIG. 3, embodiments of the streamer rotation device 50 may comprise more (or less) than two wings 65. In some embodiments, the streamer rotation device 50 may be disposed inline between adjacent streamer sections 40a, 40b. To cause rotation, rotational torque may be introduced into the wings 65 to produce rotation of the streamer rotation device 50. Rotational torque may be introduced by, for example, introducing a wing rotation (e.g., clockwise rotation) relation to the wing axis to generate torque on the streamer 40. As the streamer rotation device 50 rotates, the rotational torque may be incrementally reduced to slow the rate of rotation until the desired rotation has been achieved. The streamer rotation device 50 may further include a local rotation device control system 75. In some embodiments, the local rotation device control system 75 may function to control rotational movement of the streamer rotation device 50.

Figure 4:
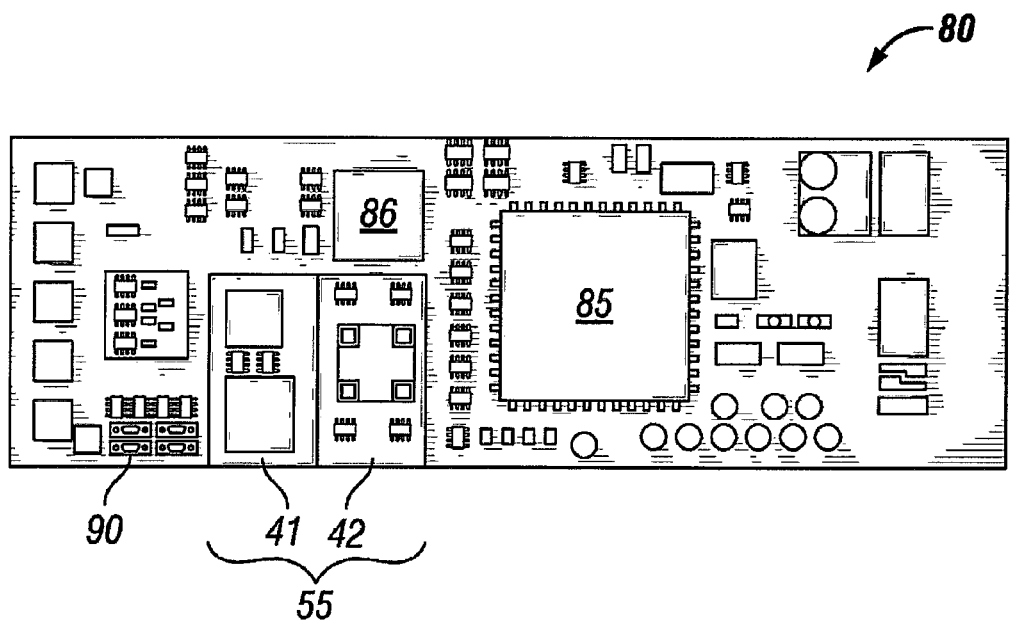
FIG. 4 illustrates a sensor package disposed on a circuit board in accordance with example embodiments.

As illustrated in FIG. 4, sensor package 55 may be disposed on a circuit board 80 in accordance with example embodiments. Circuit board 80 may be an internal or external component of any geophysical surveying equipment (e.g., streamers, sensors, ocean bottom cables, sources, paravanes, etc.). Circuit board 80 may comprise a processor 85, input/output ("I/O") interface(s) 90, primary orientation sensor 41, and/or complementary orientation sensor 42. Processor 85 may comprise one or more central processing unit(s) or may be distributed across one or more processors in one or more locations. I/O interface(s) 90 may be communicatively coupled to processor 85. I/O interface(s) 90 may be any suitable system for connecting circuit board 80 to a recording system 20 (as shown in FIG. 1). A communication link (not shown) may be used to connect recording system 20 to circuit board 80. Examples of a communication link include a direct connection, a private network, a virtual private network, a local area network, a wide area network ("WAN"), a wireless communication system, or combinations thereof.

The primary orientation sensor 41 and the complementary orientation sensor 42 may be coupled to processor 85. In some embodiments, the primary orientation sensor 41 and the complementary orientation sensor 42 may be integrated. In alternative embodiments, the primary orientation sensor 41 and the complementary orientation sensor 42 may not be integrated. In some embodiments, it may be beneficial if the complementary orientation sensor 42 is co-located with the primary orientation sensor (e.g., fixed to the same circuit board). In some embodiments, it may be beneficial if the complementary orientation sensor 42 is near (e.g., within 10 cm) to the primary orientation sensor. In some embodiments, where the primary orientation sensor comprises a MEMS accelerometer, it may be beneficial if the complementary orientation sensor 42 is also a component of the MEMS device, such that the primary orientation sensor 41 and the complementary orientations sensor 42 make a single MEMS device. In some embodiments, a gyroscope 86 could be used with or in place of a magnetometer for the MEMS device. With the use of the gyroscope 86, the rotational part of the MEMS primary orientation sensor 41 (e.g., an accelerometer) could be separated from the linear motion. This may in turn enable suppression of the lateral noise seen on a MEMS accelerometer. However, the gyroscope 86 may be harder to calibrate, since it may lack a stable external reference.

Data processing and analysis software native to recording system 20 and/or installed on recording system 20 may be used to analyze the data generated by sensor package 55. This procedure may be automated such that the analysis happens without the need for operator input or control. Further, the operator may select from several previously input parameters or may be able to recall previously measured data. The data may be transferable and/or storable on computer-readable media, such as one or more USB drive(s), if desired.

Figure 5A:
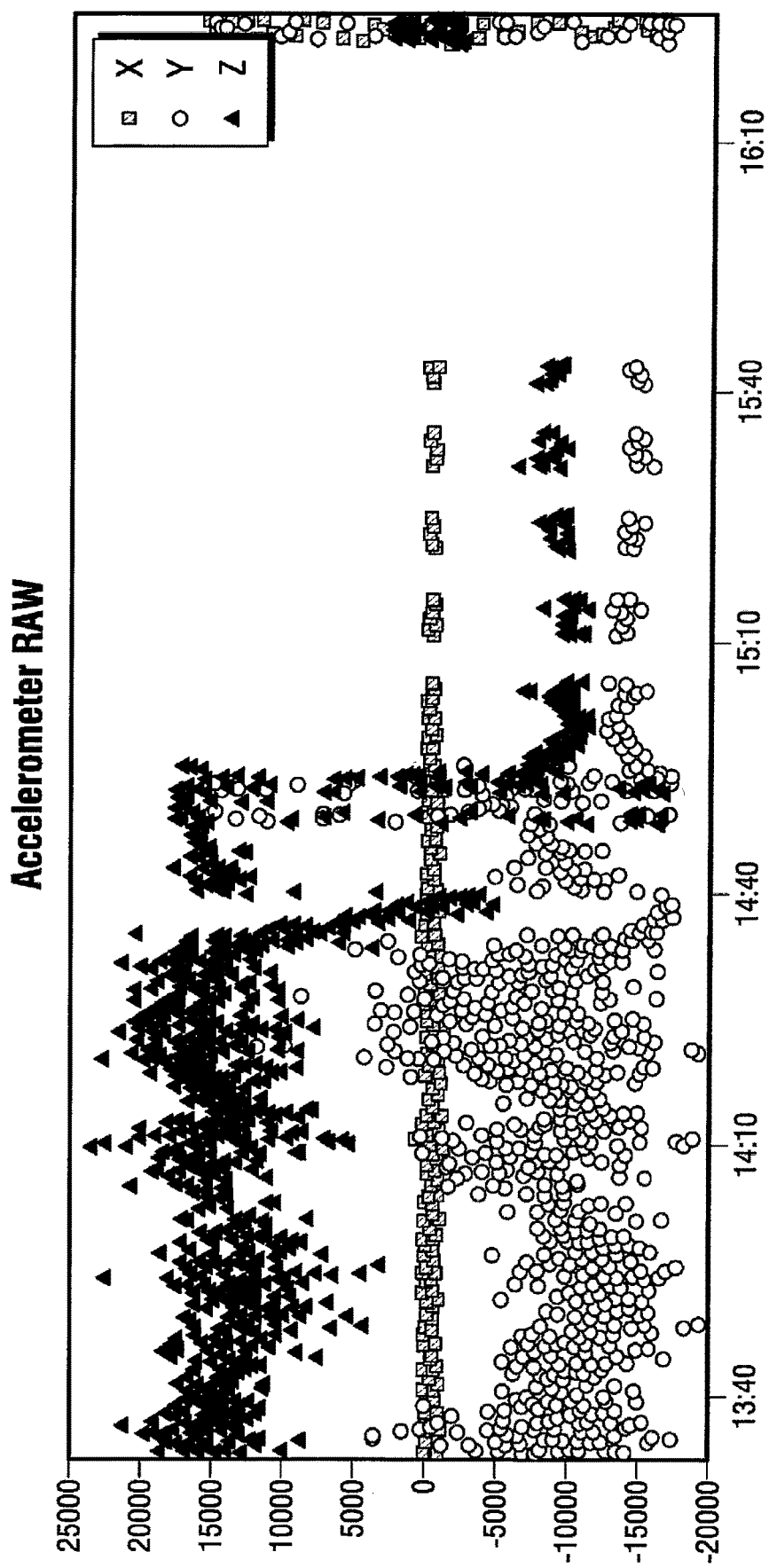
FIG. 5A illustrates raw primary orientation sensor data in accordance with example embodiments.
Figure 5B:
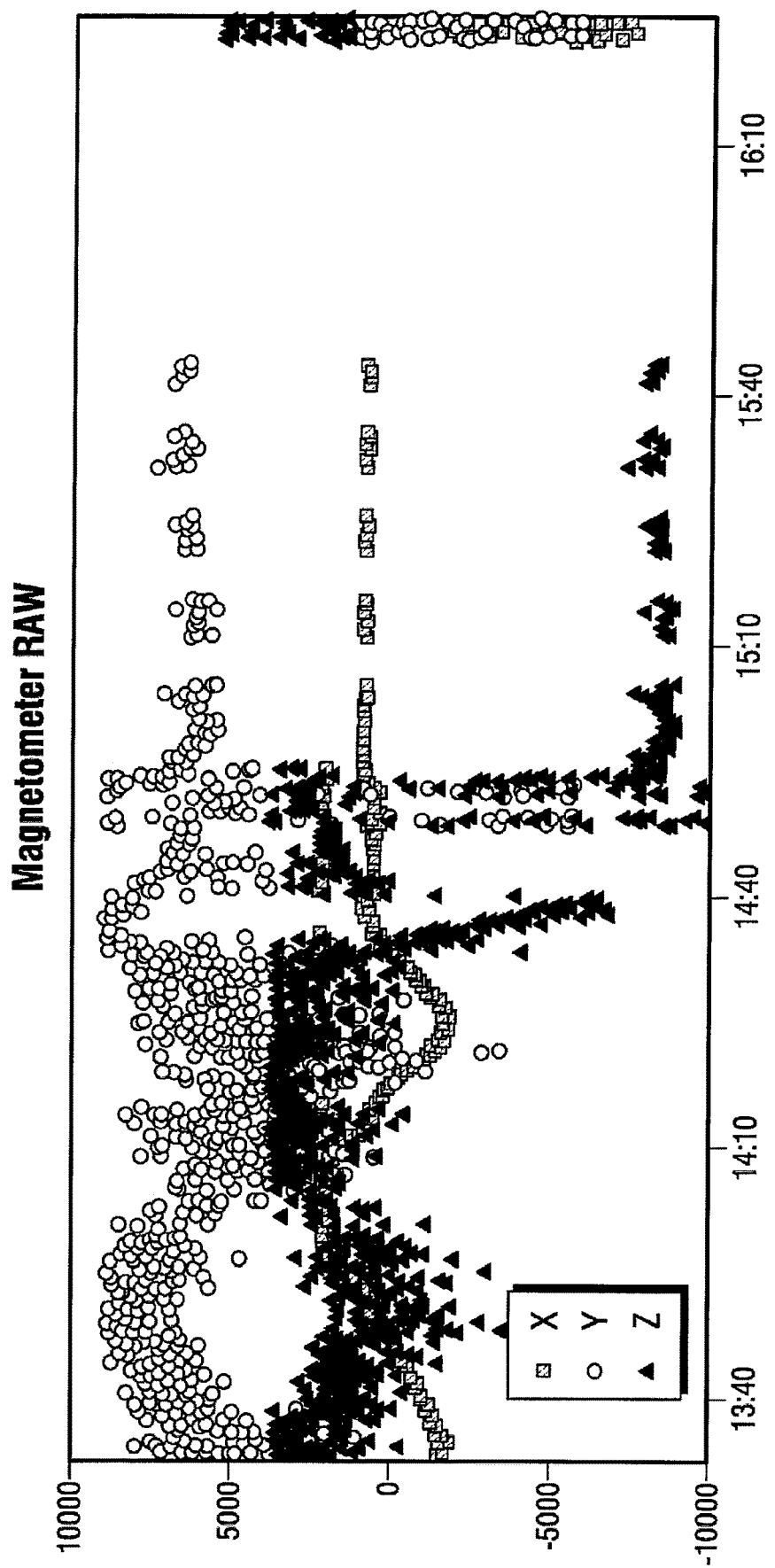
FIG. 5B illustrates raw complementary orientation sensor data in accordance with example embodiments.
Figure 6A:
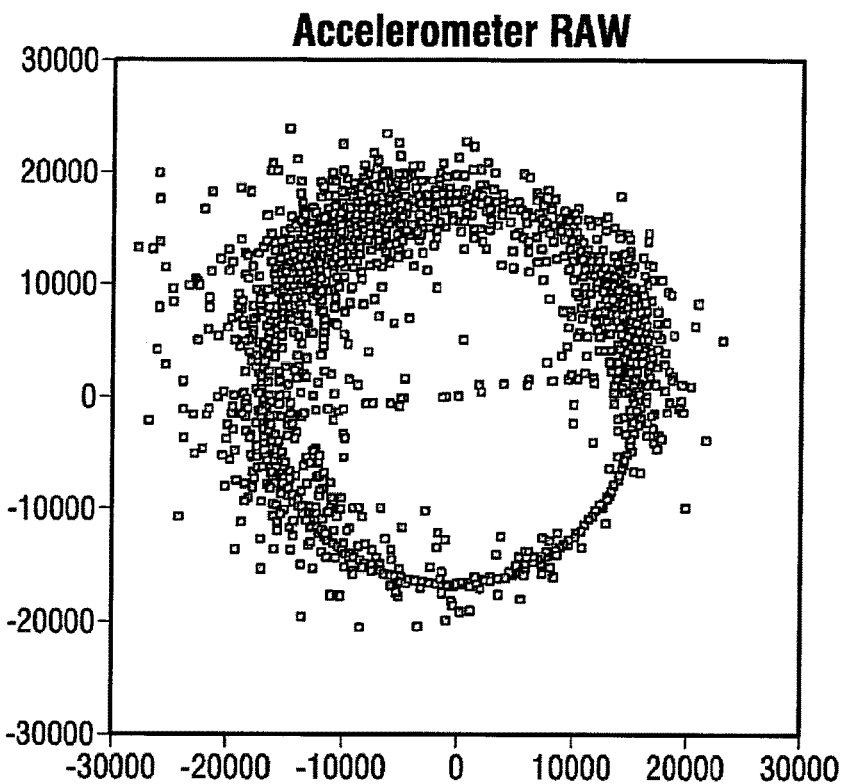
FIG. 6A illustrates a scatterplot of the Y-Z trajectory of the raw primary orientation sensor data in accordance with an embodiment of the invention.
Figure 6B:
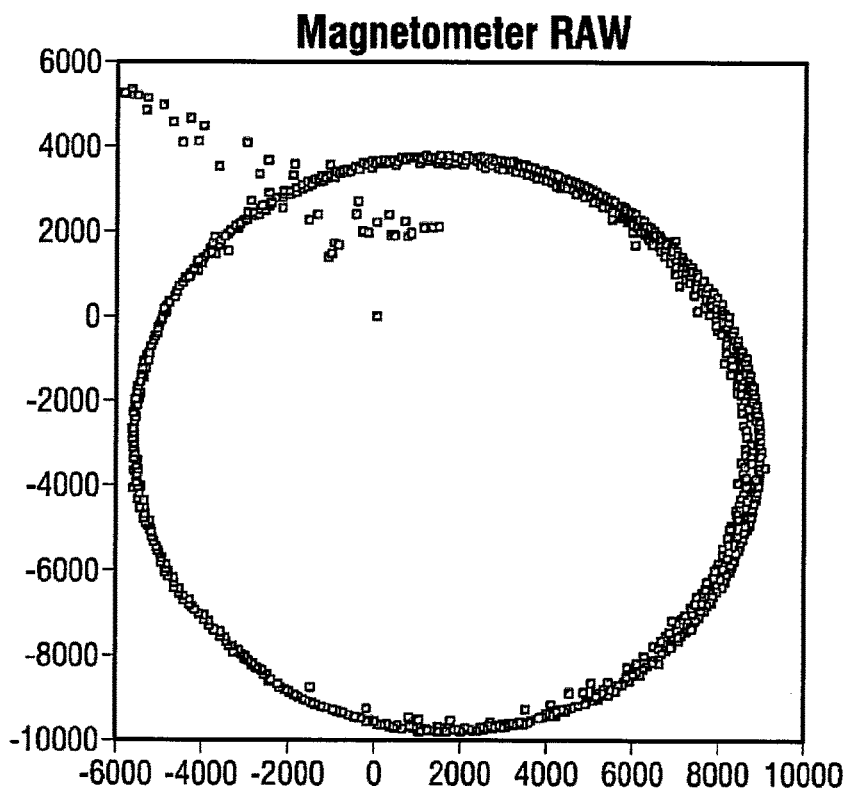
FIG. 6B illustrates a scatterplot of the Y-Z trajectory of the raw complementary orientation sensor data for example embodiments.

The effect of overlaid linear acceleration (e.g., turn noise) on a sensor package 55 which includes a primary orientation sensor 41 (e.g., an accelerometer) and a complementary orientation sensor 42 (e.g., a magnetometer) is depicted on FIGS. 5A and 5B. FIG. 5A illustrates raw accelerometer data, and FIG. 5B illustrates raw magnetometer data. This data was collected during a 540° turn, using a sensor package 55 comprising an integrated primary orientation sensor 41 (e.g., the accelerometer device) and a complementary orientation sensor 42 (e.g., the magnetometer device) attached to a streamer 40 (e.g., in the configuration illustrated on FIG. 1). Such data may be received during a turn or other operation of a streamer 40. The difference between the readings from the primary orientation sensor 41 and the complementary orientation sensor 42 is not readily apparent when analyzed through just the raw data. However, if the raw data is converted to a scatterplot of the y-z trajectory of the streamer transversal plane the difference becomes apparent. FIGS. 6A and 6B illustrate examples of the converted raw data as the scatterplot of the y-z trajectory of primary orientation sensor 41 and the complementary orientation sensor 42 data. FIG. 6A illustrates converted raw accelerometer data, and FIG. 6B illustrates converted raw magnetometer data. The level of overlaid linear acceleration is now readily distinguished when comparing FIGS. 6A and 6B. The overlaid linear acceleration present in the primary orientation sensor 41 (e.g., the accelerometer) data is visually represented as blurring and/or other variations in the circular nature of the circle illustrated in FIG. 6A. As shown by FIG. 6B, this blurring is greatly reduced. As such, the significantly lower noise levels in the complementary orientation sensor 42 data may significantly reduce the noise in the streamer 40 roll angle determination.

Figure 7A:
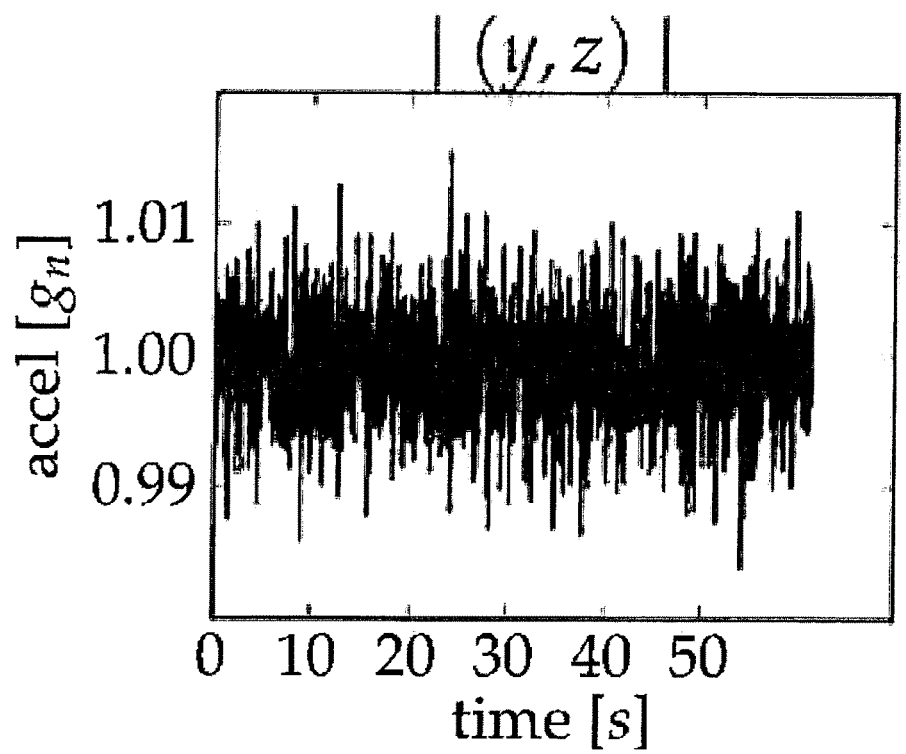
FIG. 7A is a graph of the magnitude of y-z local-position components from DC-coupled accelerometer data as a function of time.
Figure 7B:
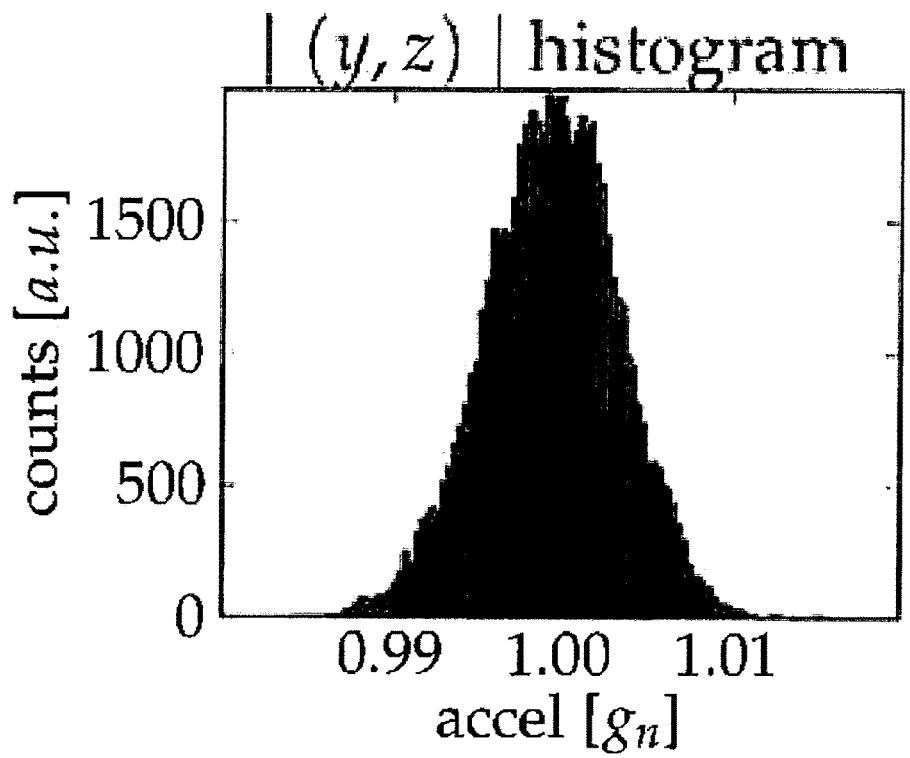
FIG. 7B is a histogram of the magnitudes in FIG. 7A.

Given the local coordinate system (x, y, z) as shown in FIG. 2 for a sensor package on a seismic streamer, FIG. 7A is a graph of the magnitude of y-z local-position components from DC-coupled accelerometer data as a function of time. FIG. 7B is a histogram of the magnitudes in FIG. 7A. As shown in FIGS. 7A and 7B, the magnitude varies about the normalized value of 1.00 as a function of time. This is consistent with a roll motion of the seismic streamer.

Figure 7C:
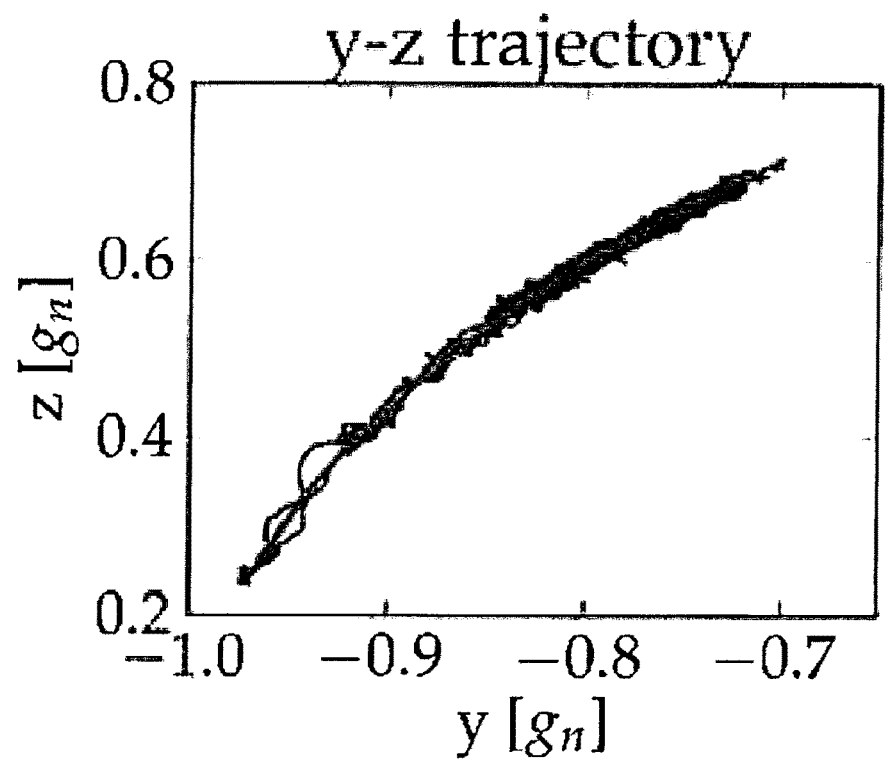
FIG. 7C is a graph of the y-z local-position trajectory from the accelerometer data. As depicted, the y-z position trajectory confirms the roll motion of the seismic streamer.

FIG. 7C is a graph of the y-z local-position trajectory from the accelerometer data. As depicted, the y-z position trajectory confirms the roll motion of the seismic streamer.

Figure 7D:
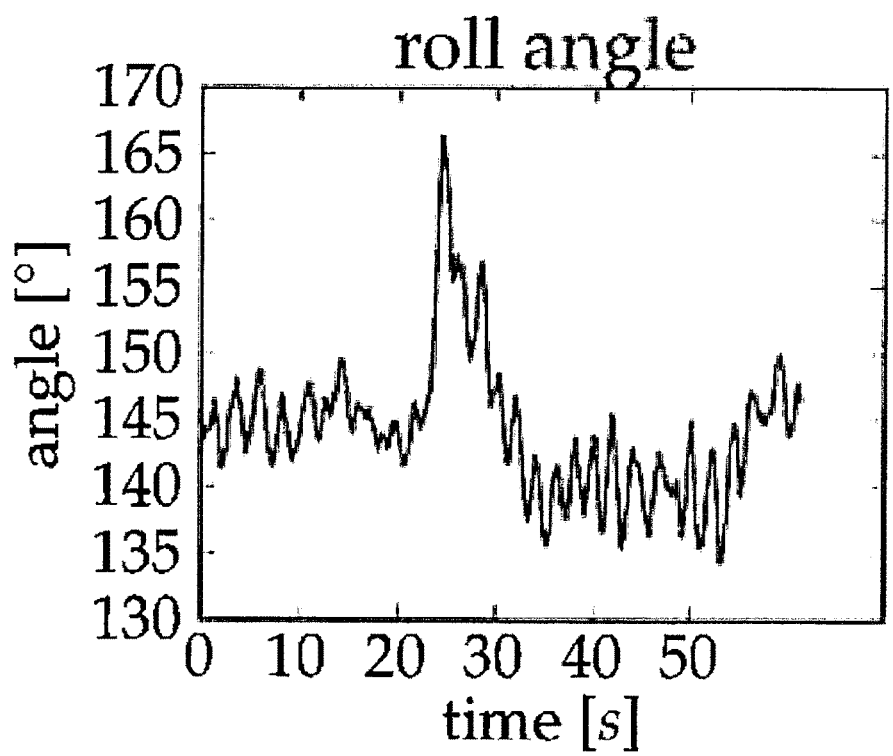
FIG. 7D is a graph of the roll angle as a function of time from the accelerometer data.

FIG. 7D is a graph of the roll angle as a function of time from the accelerometer data. In this example, the roll angle varies as a function of time within a range from about 135 degrees to about 165 degrees. The varying roll angle of the sensor package on a seismic streamer causes inaccuracies in the orientation data obtained by a fixed-mount motion sensor.

Figure 8:
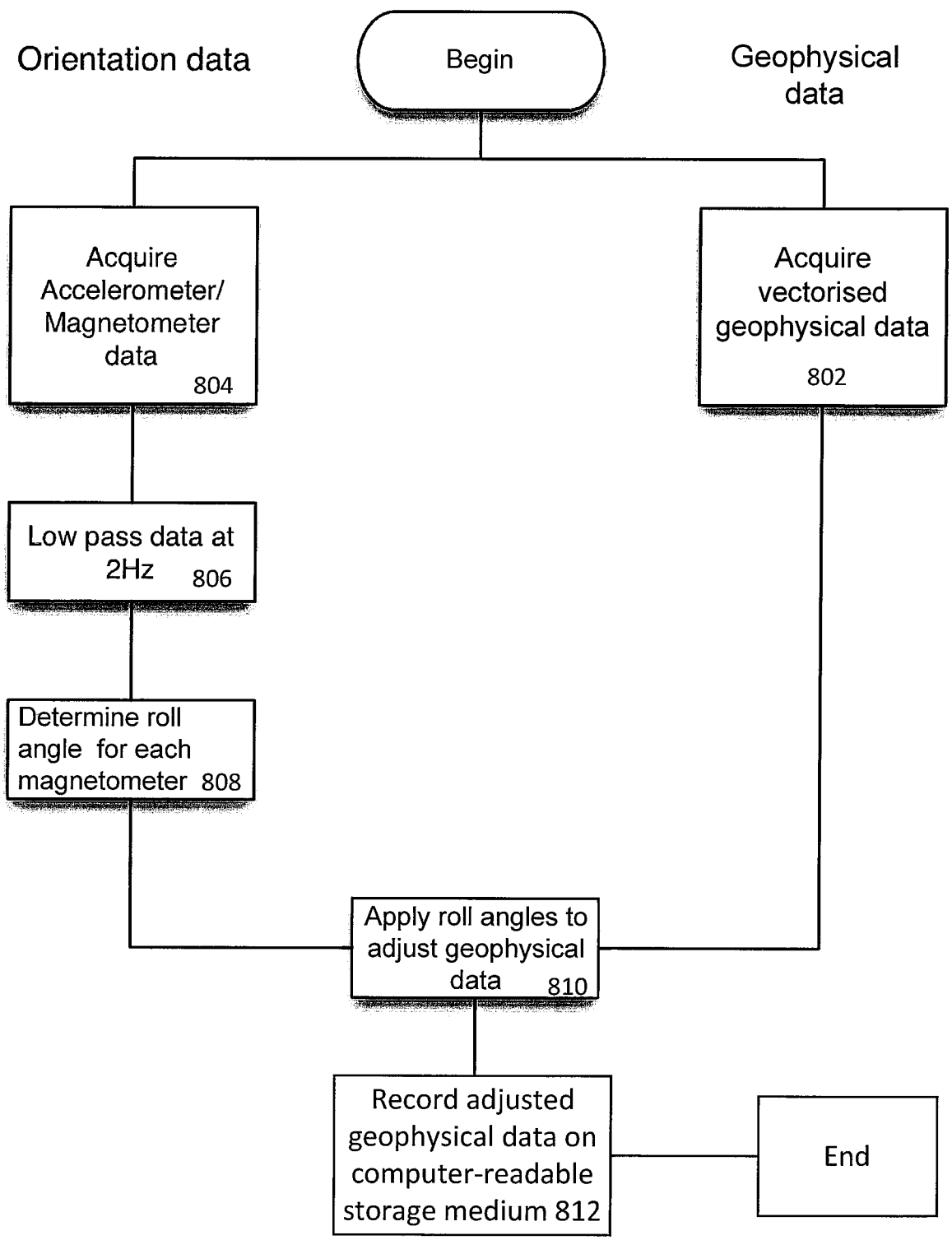
FIG. 8 is a flow chart of a method of dynamic roll compensation of a vector sensor in a streamer environment using a magnetometer in accordance with an embodiment of the invention.

FIG. 8 is a flow chart of a method 800 of dynamic roll compensation of a vector sensor in a streamer environment using a magnetometer in accordance with an embodiment of the invention. The method 800 provides instantaneous roll compensation at in time during a marine seismic survey in an advantageous way that is less sensitive to contamination by translational acceleration noise.

The right branch of the flow chart pertains to the acquisition of geophysical data and includes block 802. The left branch of the flow chart pertains to the acquisition and processing of orientation data and includes blocks 804, 806 and 808. In accordance with an embodiment of the invention, the left and right branches are performed in parallel during a marine seismic survey.

Per block 802, vectorised geophysical data is acquired during the marine geophysical survey. The geophysical data is vectorised in that it has both magnitude and directional components. For example, a geophone measures a velocity that is proportional to the Earth particle velocity at its location. Hence, geophones are vector sensors and may be used to measure both a magnitude of Earth motion and a direction of that motion. In contrast, hydrophones measure pressure variations and may be used to obtain scalar (not vectorised) geophysical data. This is because the pressure data does not provide directional information.

Per block 804, orientation data is acquired in parallel with (i.e. at the same time as) the acquisition of the vectorised geophysical data during the marine geophysical survey. During the marine geophysical survey, the survey vessel may travel along a path that includes various turns so as to cover a desired region. During such turns, the orientation of the geophysical acquisition equipment may vary, resulting in changes in the orientation data.

In accordance with an embodiment of the invention, DC-coupled magnetometers are used to acquire the orientation data. In addition to the DC-coupled magnetometers, MEMS accelerometers may also be used. In an exemplary implementation, the accelerometers may be used as primary orientation sensors, and the magnetometers may be used as complementary orientation sensors.

Per block 806, the orientation data from each magnetometer may be low-pass filtered. The low-pass filtering may be performed using a low-pass filter with a cut-off frequency of 2 Hertz (Hz), for example. This low-pass filtering removes noise effects in the roll angle determination.

Per block 808, instantaneous roll angles may be determined for each magnetometer. Each magnetometer has a fixed local z-axis and provides measurements from which the global Z-axis may be calculated. Hence, as indicated in FIG. 2, the roll angle θ at any instant in time may be determined by finding the angle between the global Z-axis and the local z-axis.

Per block 810, the instantaneous roll angles are used to adjust the vectorised geophysical data. In an exemplary implementation, the roll angles for geophysical sensors at locations between magnetometers on a streamer may be determined by a predetermined interpolation function based on the roll angles determined at the magnetometers along the streamer.

Per block 812, the adjusted geophysical data is recorded on a computer-readable storage medium (or computer-readable storage media).

Figure 9:
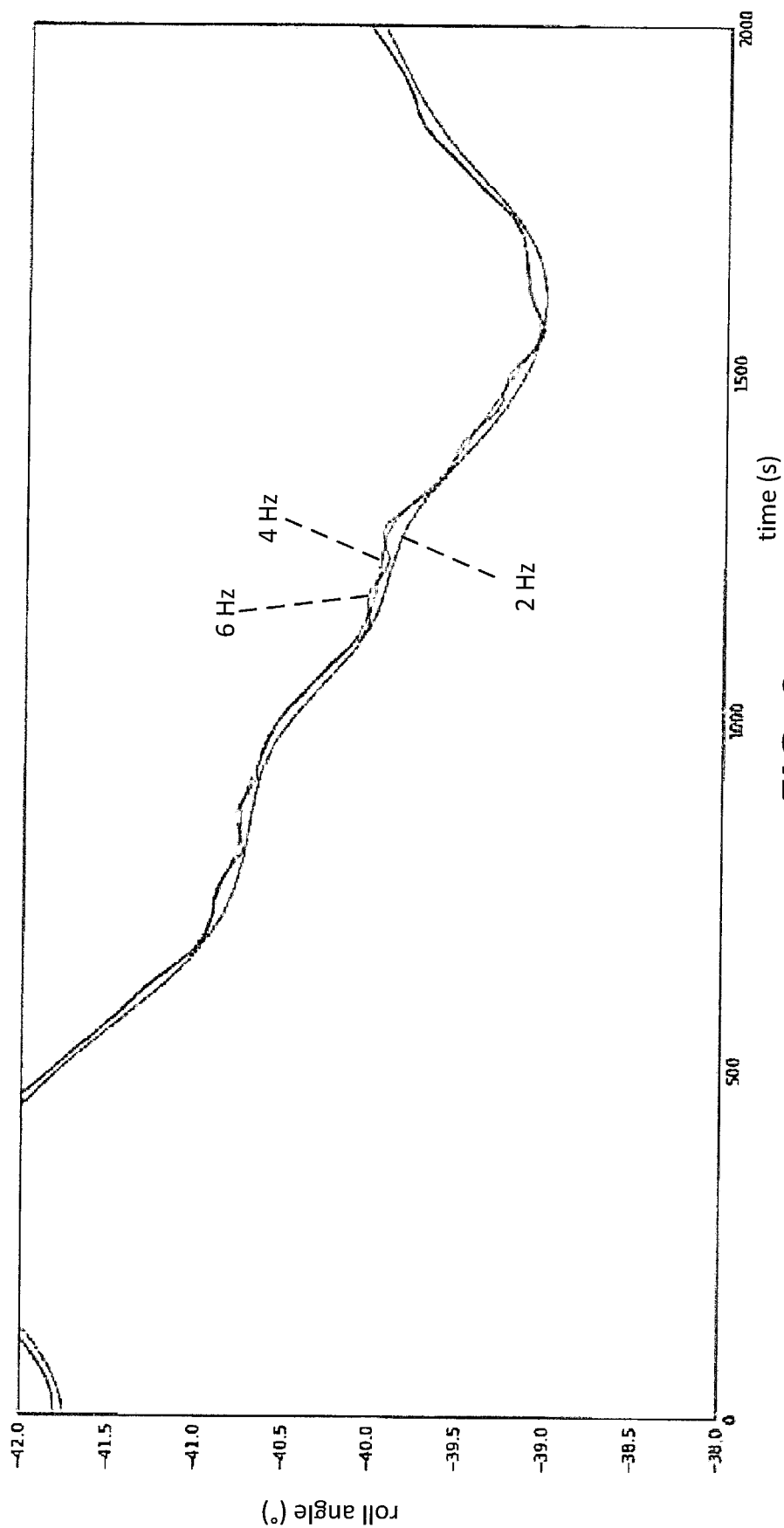
FIG. 9 is graph showing examples of roll angle extracted from low-pass filtered magnetometer data with cut-off frequencies at 2 Hz, 4 Hz and 6 Hz in accordance with an embodiment of the invention.

FIG. 9 is a graph showing examples of roll angle extracted from low-pass filtered magnetometer data with cut-off frequencies at 2 Hz, 4 Hz and 6 Hz in accordance with an embodiment of the invention. As shown, using the low-pass filtered magnetometer data, the extracted roll angle is a substantially smooth function of time. Lower cut-off frequencies include only lower-frequency data and so result in smoother roll-angle determinations. In an exemplary implementation, a cut-off frequency of 2 Hz may be used for the low-pass filtering.

Figure 10:
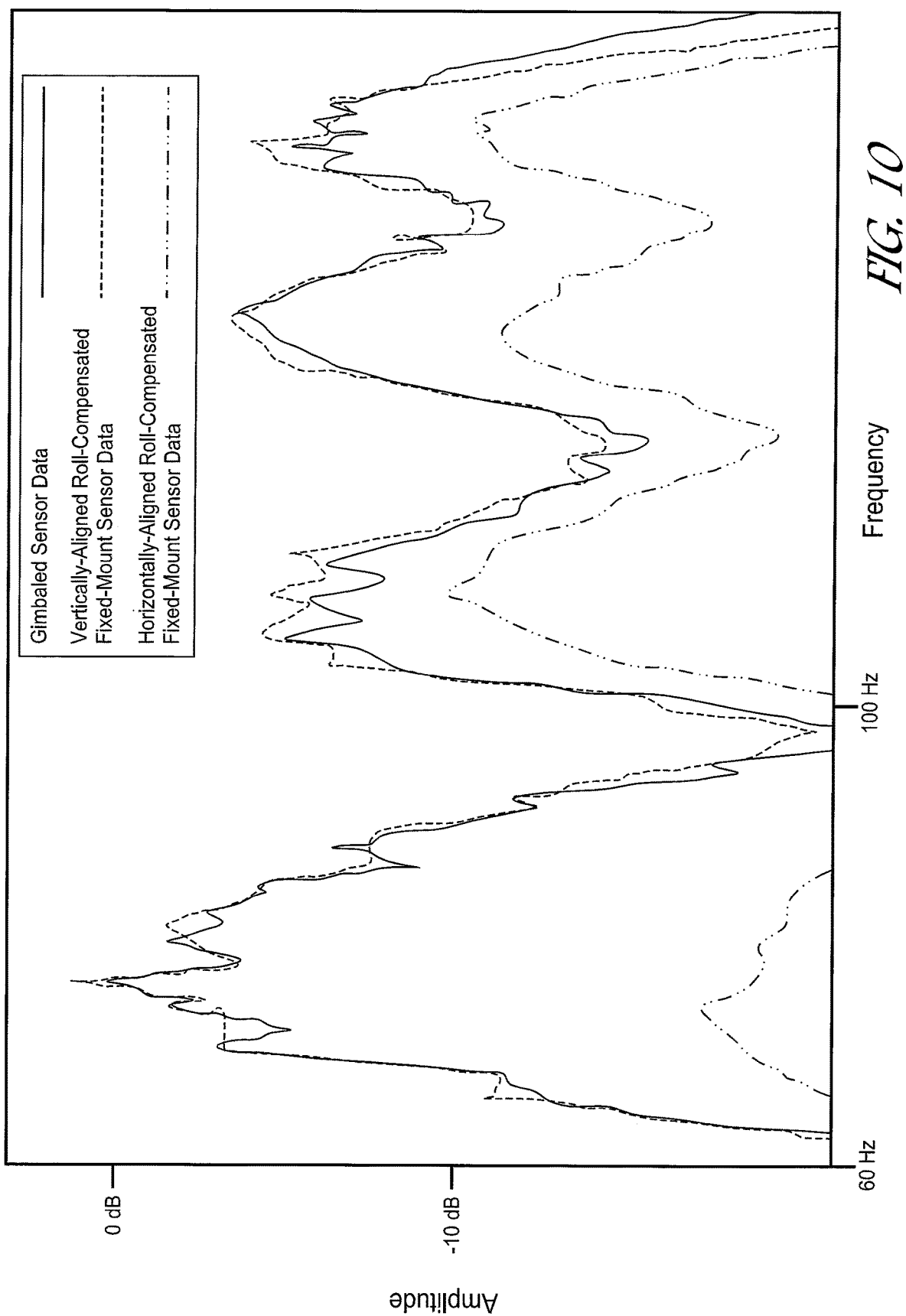
FIG. 10 is a graph showing that the roll-compensated fixed-mount sensor data corresponds very well with the gimbaled sensor data in accordance with an embodiment of the invention.

FIG. 10 is a graph showing that the vertically-aligned roll-compensated fixed-mount sensor data corresponds very well with the gimbaled sensor data in accordance with an embodiment of the invention. The vertically-aligned data is obtained by aligning the fixed local z-axis of the magnetometer to the global z-axis. The graph shows amplitude (log scale) as a function of frequency (log scale).

As further shown, the horizontally-aligned roll-compensated fixed-mount sensor data has an amplitude vs. frequency graph that has suppressed peaks compared to the gimbaled sensor data and also compared to the vertically-aligned roll-compensated fixed-mount sensor data. The horizontally-aligned data is obtained by aligning the fixed local y-axis of the magnetometer to the global y-axis. The advantage of using the vertically-aligned data, instead of the horizontally-aligned data, is thus shown by the data in FIG. 10.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

What is claimed is:

1. A method of performing a marine seismic survey, the method comprising:
   towing a streamer behind a survey vessel in a body of water, wherein the streamer includes a plurality of geophysical sensors and a plurality of orientation sensor packages, wherein each orientation sensor package comprises a magnetometer;
   acquiring vectorised geophysical data using the plurality of geophysical sensors;
   receiving orientation data from the plurality of orientation sensor packages, said orientation data being acquired by the magnetometer;

filtering the orientation data from each magnetometer with a low pass filter to obtain low-frequency orientation data;

using the low-frequency orientation data, without using orientation data at higher frequencies than the frequencies present in the low-frequency orientation data, to determine an instantaneous roll angle of the streamer at different positions on the streamer; and adjusting the vectorised geophysical data to compensate for the instantaneous roll angle of the streamer at different positions on the streamer.

2. The method of claim 1, wherein acquiring the vectorised geophysical data involves actuating an energy source to emit energy downward through the body of water.

3. The method of claim 1, wherein the plurality of geophysical sensors includes seismic sensors from the group of seismic sensors consisting of geophones, hydrophones, accelerometers, electromagnetic field sensors, and combinations thereof.

4. The method of claim 1, wherein the magnetometer comprises a complementary orientation sensor and measures an inclination and azimuthal angle of the Earth's magnetic field.

5. The method of claim 4, wherein the orientation sensor package further comprises an accelerometer that comprises a primary orientation sensor which measures a projection of gravity along at least one sensing axis.

6. The method of claim 5, wherein measurements by the complementary orientation sensor is used in place of, or in supplement to, measurements by the primary orientation sensor to provide accurate orientation data during turns.

7. The method of claim 5, wherein measurements by the complementary orientation sensor is used in place of, or in supplement to, measurements by the primary orientation sensor to provide accurate orientation data when vibrations larger than a threshold are detected in the measurements by the primary orientation sensor.

8. The method of claim 5, wherein measurements by the primary orientation sensor is used in place of, or in supplement to, measurements by the complementary orientation sensor to provide accurate orientation data when electrical interference is present and when magnetic inclination of the magnetometer is near zero.

9. The method of claim 5, wherein measurements by the primary orientation sensor is used in place of, or in supplement to, measurements by the complementary orientation sensor to provide accurate orientation data when electrical interference above a threshold is present in the measurements by the complementary orientation sensor.

10. The method of claim 1, wherein the low-pass filter has a cut-off frequency in a range from 2 Hertz to 6 Hertz.

11. The method of claim 1, wherein the instantaneous roll angle of the streamer is determined relative to a vertical direction.

12. The method of claim 1, wherein the vectorised geophysical data has both magnitude and directional components, and wherein adjusting the vectorised geophysical data involves changing the directional components based on the instantaneous roll angle of the streamer at the different positions on the streamer.

13. An apparatus for performing a marine seismic survey, the system comprising:

a streamer to be towed behind a survey vessel in a body of water during the marine seismic survey;

a plurality of geophysical sensors on the streamer to acquire vectorised geophysical data during the marine seismic survey;

a plurality of orientation sensor packages on the streamer to acquire orientation data during the marine seismic survey, wherein the orientation sensor package comprises a magnetometer for acquiring said orientation data;

a recording system to receive and process the vectorised geophysical and orientation data, wherein the orientation data from the magnetometers is low-pass filtered to obtain low-frequency orientation data, wherein the recording system uses the low-frequency orientation data, without using orientation data at higher frequencies than the frequencies present in the low-frequency orientation data, to determine an instantaneous roll angle of the streamer at different positions on the streamer, and wherein the recording system adjusts the vectorised geophysical data to compensate for the instantaneous roll angle of the streamer at different positions on the streamer.

14. The apparatus of claim 13 further comprising an energy source that is actuated to emit energy downward through the body of water.

15. The apparatus of claim 13, wherein the plurality of geophysical sensors includes seismic sensors from the group of seismic sensors consisting of geophones, hydrophones, accelerometers, electromagnetic field sensors, and combinations thereof.

16. The apparatus of claim 13, wherein the magnetometer comprises a complementary orientation sensor that measures an inclination and azimuthal angle of the Earth's magnetic field.

17. The apparatus of claim 16, wherein the orientation sensor package comprises an accelerometer that comprises a primary orientation sensor which measures a projection of gravity along at least one sensing axis.

18. The apparatus of claim 16, wherein measurements by the complementary orientation sensor is used in place of, or in supplement to, measurements by the primary orientation sensor to provide accurate orientation data during turns.

19. The apparatus of claim 16, wherein measurements by the complementary orientation sensor is used in place of, or in supplement to, measurements by the primary orientation sensor to provide accurate orientation data when vibrations larger than a threshold are detected in the measurements by the primary orientation sensor.

20. The apparatus of claim 16, wherein measurements by the primary orientation sensor is used in place of, or in supplement to, measurements by the complementary orientation sensor to provide accurate orientation data when electrical interference is present and when magnetic inclination of the magnetometer is near zero.

21. The apparatus of claim 16, wherein measurements by the primary orientation sensor is used in place of, or in supplement to, measurements by the complementary orientation sensor to provide accurate orientation data when electrical interference above a threshold is present in the measurements by the complementary orientation sensor.

22. The apparatus of claim 13, wherein the low-pass filter has a cut-off frequency in a range from 2 Hertz to 6 Hertz.

23. The apparatus of claim 13, wherein the vectorised geophysical data has both magnitude and directional components, wherein the recording system adjusts the vectorised geophysical data by changing the directional components based on the instantaneous roll angle of the streamer at the different positions on the streamer.

24. A method of manufacturing a geophysical data product, the method comprising:

obtaining geophysical and orientation data acquired by towing a streamer behind a survey vessel in a body of water, wherein the streamer includes a plurality of geophysical sensors and a plurality of orientation sensor packages, and wherein the orientation sensor packages each comprise a magnetometer for acquiring the orientation data;

filtering the orientation data from the magnetometers with a low pass filter to obtain low-frequency orientation data;

using the low-frequency orientation data, without using orientation data at higher frequencies than the frequencies present in the low-frequency orientation data, to determine an instantaneous roll angle of the streamer at different positions on the streamer;

adjusting the geophysical data to compensate for the instantaneous roll angle of the streamer at different positions on the streamer; and recording the adjusted geophysical data on a computer-readable medium storage.

* * * * *